Aug. 6, 1968   R. F. COTTRELL   3,395,825
FRANGIBLE CLOSURE FOR AUXILIARY PORT IN ROCKET HOUSING
Filed June 8, 1966   3 Sheets-Sheet 1

INVENTOR.
RICHARD F. COTTRELL
BY Edward O. Ansell
William E. Hiller
ATTORNEYS

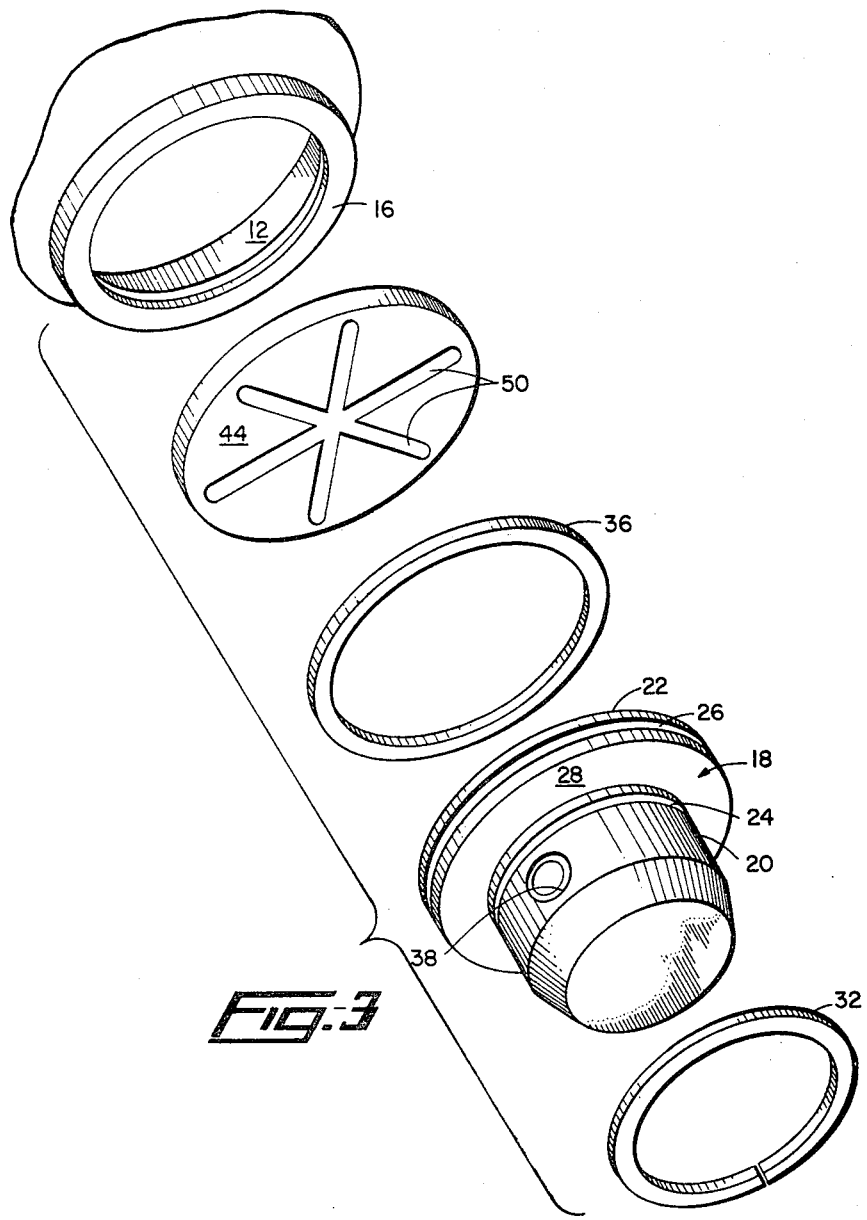

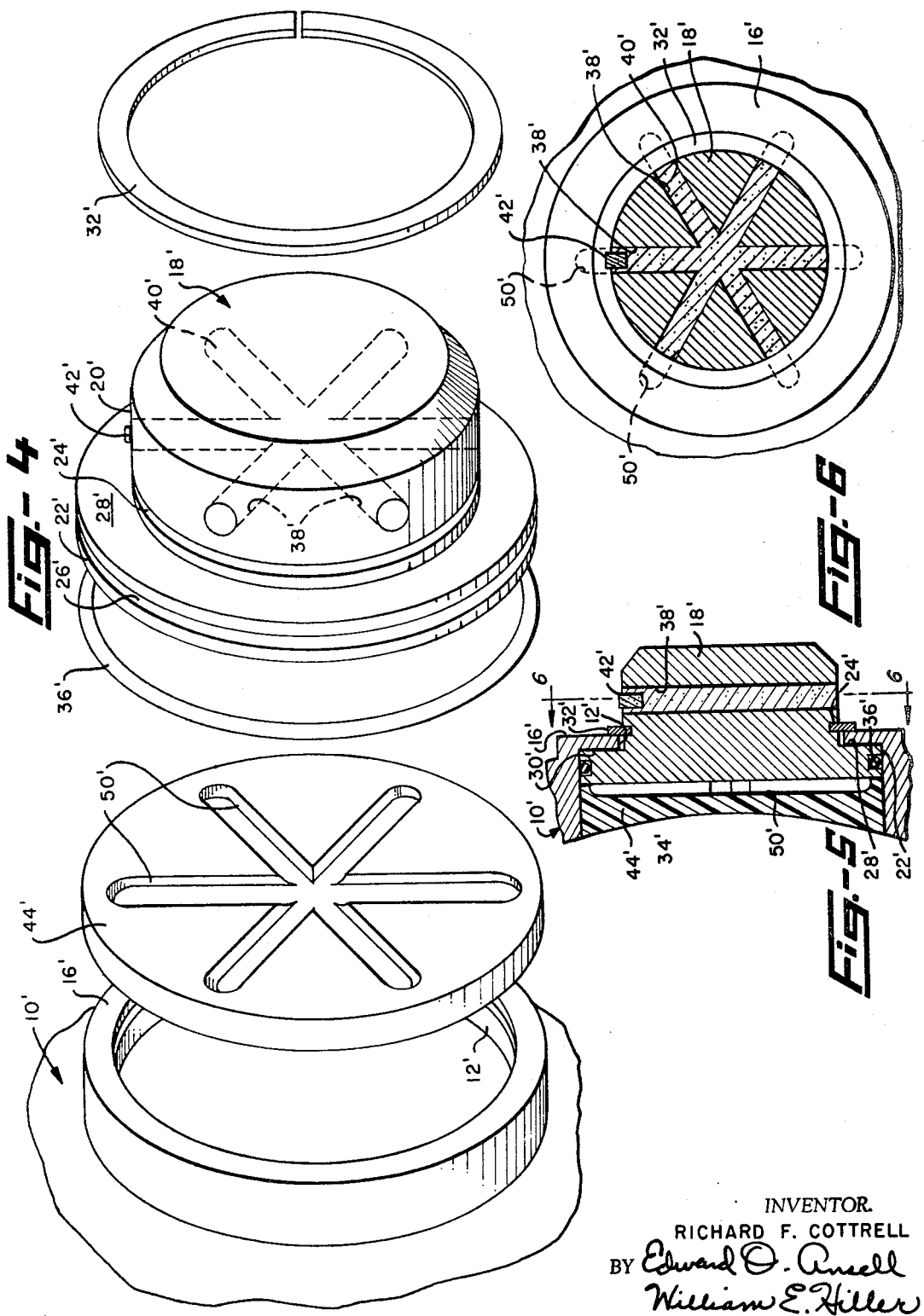

United States Patent Office 3,395,825
Patented Aug. 6, 1968

3,395,825
FRANGIBLE CLOSURE FOR AUXILIARY PORT IN ROCKET HOUSING
Richard F. Cottrell, Carmichael, Calif., assignor to Aerojet-General Corporation, El Monte, Calif., a corporation of Ohio
Continuation-in-part of application Ser. No. 482,023, Aug. 12, 1965. This application June 8, 1966, Ser. No. 556,077
3 Claims. (Cl. 220—47)

ABSTRACT OF THE DISCLOSURE

A frangible closure for an auxiliary port in a rocket that is shattered by the detonation of an explosive material. The protective insulating plate of the closure has weakening bores in it so that upon the detonation of the explosive material the insulating plate is completely shattered thereby given a completely clear port for rocket thrust expulsion.

---

This application is a continuation-in-part of my co-pending application, Ser. No. 482,023, filed Aug. 12, 1965, now abandoned.

This invention relates to a device for opening one or more auxiliary ports in a rocket motor housing and more particularly to a frangible plug or closure which maintains auxiliary ports in a rocket motor housing sealed until thrust reversal or thrust termination is required.

Thrust termination, thrust reversal, or thrust modification, in a solid propellant rocket motor can be done by forming the rocket motor housing with a number of appropriately positioned auxiliary ports, openings, or nozzles through which the products of combustion of the solid propellant may pass. Since, in normal operation, these auxiliary ports, openings, or nozzles must be sealed in order for the rocket motor to obtain its designed thrust, highly reliable yet simple removable closures or plugs must be provided for opening these auxiliary ports, openings, or nozzles, when circumstances require.

What is needed, therefore, and comprises the principal object of this invention, is to provide a closure or group of closures which can be actuated to simultaneously open one or more auxiliary ports or nozzles in a rocket motor housing.

In its principal aspect, the device comprises a retaining plug installed in an auxiliary port or opening in a rocket housing and adapted to be shattered upon the detonation of an explosive charge carried thereby. To protect the plug from premature destruction because of the high temperatures within the rocket housing which may detonate the explosive charge carried by the plug, a temperature-insulating plate is installed within the auxiliary port so as to be disposed inwardly of the plug and bearing against the inner surface of the plug. As described in my co-pending application, Ser. No. 482,023, filed Aug. 12, 1965, the plug is provided with a transverse opening in which explosive material is disposed so as to shatter the plug upon detonation of the explosive material, and the protective insulating plate is provided with weakened portions to facilitate shattering of the protective insulating plate when the explosive material in the plug is detonated. Since the protective insulating plate must be relatively thick in order to prevent heat from the interior of the rocket housing from prematurely detonating the explosive material carried by the plug, there is a possibility that the protective insulating plate may not shatter properly when the explosive material carried by the plug is detonated upon command, even when the protective insulating plate is provided with weakened portions as described in my co-pending application, Ser. No. 482,023, filed Aug. 12, 1965, now abandoned. If the protective insulating plate is not properly shattered upon detonation of the explosive material carried by the plug, the auxiliary port may not open at the required time or may be incompletely opened which would adversely affect the performance of the rocket. Accordingly, an improved closure device is disclosed herein which can be actuated so as to open an auxiliary port in a rocket housing upon command. The improved device reliably achieves substantially simultaneous shattering of the plug and the protective insulating plate therefor by providing an explosive-receiving opening in the plug which includes a plurality of uniform angularly spaced bores extending radially outwardly from a common center wherein the radially extending bores of the opening are at least more than three in number, the opening being filled with explosive material and generally coinciding in shape with a composite groove formed in the protective insulating plate. The composite groove in the protective insulating plate opens outwardly toward the plug and is in spaced apart registration with the explosive-filled opening in the plug such that the explosive force generated by the detonation of the explosive material carried by the plug is at a maximum magnitude in the area covered by the composite groove in the protective insulating plate. By so arranging the explosive material carried by the plug with respect to the composite groove in the protective insulating plate which defines weakened portions therein, substantially simultaneous shattering of the plug and the protective insulating plate is assured when the explosive material is detonated. The gaseous pressure within the rocket housing then blows the shattered fragments of the plug and the protective insulating plate through the auxiliary port to open the port.

This and other objects of this invention will become more apparent when read in the light of the accompanying drawing and specification wherein:

FIGURE 3 is an exploded perspective view showing the components of the device including the plug for closing an auxiliary port in the rocket housing in accordance with the present invention;

FIGURE 4 is an exploded perspective view, similar to FIGURE 3, but showing the components of an improved device for closing an auxiliary port in the rocket housing in accordance with the present invention;

FIGURE 5 is a fragmentary longitudinal sectional view showing the improved device of FIGURE 4 as installed in an auxiliary port in the rocket housing; and FIGURE 6 is a transverse sectional view taken along the line 6—6 of FIGURE 5.

Figure 1:
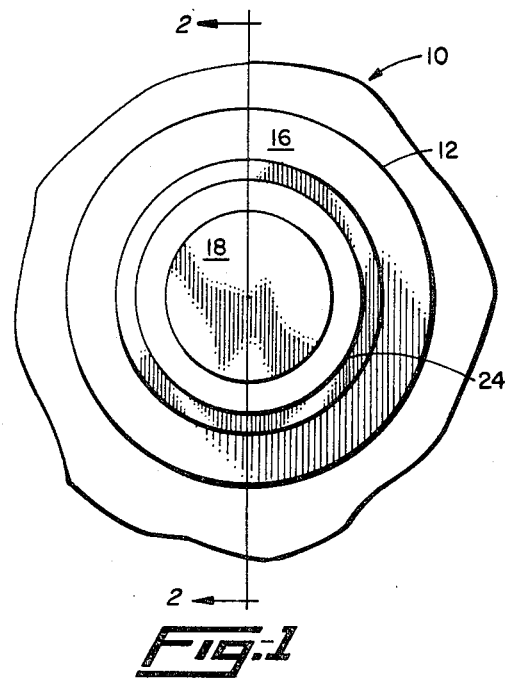
FIGURE 1 is a fragmentary end elevational view of a portion of a rocket housing showing a plug closing an auxiliary port provided therein in accordance with the present invention.
Figure 2:
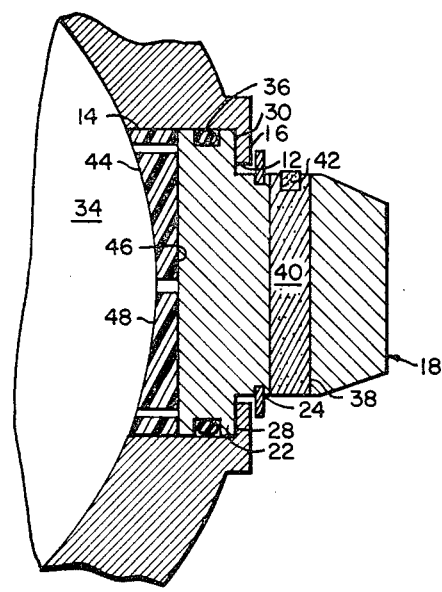
FIGURE 2 is a longitudinal sectional view taken along the line 2—2 of FIGURE 1.

Referring now to FIGURE 1 of the drawings, the rocket motor housing, indicated generally by the reference numeral 10, is provided with a counterbore 14 defining a peripheral inwardly extending annular flange 16 (see FIGURES 2 and 3). A frangible plug indicated generally by the reference numeral 18 is provided with a generally cylindrical portion 20 and an enlarged base flange-like portion 22 (see FIGURE 3). The cylindrical portion 20 and the flange-like base portion 22 are each provided with ring-receiving grooves 24 and 26 respectively.

The frangible plug 18 is inserted inside port 12 with surface 28 of the flange-like base portion 22 bearing against the adjacent surface 30 of the inwardly extending flange 16 surrounding the opening defined by port 12. To retain the frangible plug 18 in position in port 12, a retaining ring 32 is mounted inside groove 24, as best seen in FIGURE 2. Since, in operating condition, the interior of the motor housing 34 is under high gas pressure, leakage may be prevented by inserting a sealing ring 36 inside groove 26 (see FIGURE 2).

The frangible plug may be provided with an explosive-receiving opening in the form of a bore 38 which, in the particular embodiment shown in FIGURES 1–3, inclusive, is transverse to the axis of the frangible plug 18. An explosive 40, which may be Primacord or other conventional type explosive, is positioned in the explosive-receiving opening 38, as best seen in FIGURE 2. A detonator, indicated generally by the reference numeral 42, is connected to the explosive 40 in such a way that when the detonator is actuated by any suitable control means, the explosive detonates, fracturing plug 18.

The interior 34 of the rocket motor housing 10 has both a high temperature and a high gas pressure when the motor is in operation. For this reason, it is necessary to prevent the temperatures inside the rocket motor housing from heating the frangible plug so much that the explosive 40 is burned or detonates prematurely. To prevent this from happening, an insulating or protective plate 44 is press-fitted in counterbore 14 bearing against surface 46 of plug 18. As best seen in FIGURE 2, the inner surface 48 of the protective or insulating plate 44 is concave to conform with the inner surface of the rocket motor housing 10.

If the protective or insulating plate 44 were thick enough to be effective in preventing heat from the interior of the rocket motor housing from heating the frangible plug 18 to a temperature sufficient to cause premature detonation, there is a possibility that when the explosive 40 is detonated, causing plug 18 to break up, the insulating or protective plate 44 may not fracture so that auxiliary port 12 may not open. On the other hand, if the auxiliary plate 44 were made thin enough so that when explosive 40 is detonated, the protective or insulating plate 44 shatters, the insulating qualities of protective plate 44 may not be sufficient to keep the frangible plug from causing a premature detonation of the explosive.

In order to insure reliability in shattering when the explosive 40 is detonated, yet prevent premature detonation, the protective or insulating plate 44 is segmented by means of a composite groove comprising a plurality of uniform angularly spaced groove portions or arms 50 (see FIGURE 3). With this arrangement, when the explosive 40 detonates, shattering the frangible plug 18, the protective or insulating plate 44, weakened by the groove arms 50, will also shatter. Yet, the groove arms 50 are small enough so that the heat transfer from the interior 34 of the rocket motor housing to the frangible plug 18 will be slow enough to avoid premature detonation of explosive 40. It is, however, to be understood, that means other than the composite groove for weakening the plate 44 may be provided, such as the provision of appropriately positioned score lines. When the explosive 40 carried by the frangible plug is detonated, the force of the explosion should be sufficient to fracture the protective insulating plate. When this happens, the high pressure inside the rocket motor housing will be sufficient to force the shattered fragments of the frangible plug 18 and the protective or insulating plate 44 out of the housing.

As best seen in FIGURE 2, when the frangible plug 18 is mounted in the port 12 in the rocket motor housing, the mass of the plug on either side of the flange 16 of the housing bounding the opening defined by the port 12 is substantially the same. With this arrangement, when the explosive 40 is detonated, the blast effect tends to proceed equally in all directions from the confines of the bore 38 so that the frangible plug is shattered into generally uniformly sized pieces.

Referring to FIGURES 4–6, inclusive, an improved device in accordance with the present invention is illustrated. Parts of the improved device which correspond with like parts of the device illustrated in FIGURES 1–3, inclusive, bear the same identifying reference characters with the prime notation added so as to avoid unnecessarily repetitive description. The improved device is so constructed as to assure proper shattering of the protective insulating plate 44′ when the explosive material 40′ carried by the plug 18′ is detonated upon command. In this respect, the protective insulating plate 44′ may be required to be relatively thick in order to prevent heat from the interior 34′ of the rocket housing 10′ from prematurely detonating the explosive material 40′ carried by the plug 18′. The possibility of improper shattering of the relatively thick protective insulating plate 44′ has an adverse bearing on the reliability of the device in allowing the auxiliary port 12′ in the rocket housing 10′ to be fully open at the required time by the detonation of the explosive material 40′ carried by the plug 18′ upon command.

In the improved device of FIGURES 4–6, inclusive, the explosive-receiving opening in the plug 18′ comprises a plurality of uniform angularly spaced radial bores 38′ which extend outwardly from a common center. The plurality of radial bores 38′ in the plug 18′ correspond in number and relative position to the groove portions or arms 50′ of the composite groove formed in the protective insulating plate 44′. Thus, the radial bores 38′ in the plug 18′ are respectively aligned in registration with corresponding groove portions or arms 50′ of the composite groove formed in the protective insulating plate 44′. The explosive material 40′, which may comprise Primacord, for example, fills the radial bores 38′ forming the explosive-receiving opening in the plug 18′. A detonator 42′ is connected to the explosive material 40′.

Upon actuating the detonator 42′ to detonate the explosive material 40′, the explosive force which is generated has a maximum effect in the area covered by the groove arms 50′ of the composite groove in the protective insulating plate 44′ to assure substantially simultaneous shattering of the protective insulating plate 44′ along with the shattering of the plug 18′. Preferably, the number of the radial bores 38′ in the plug 18′ and the groove arms 50′ of the composite groove in the protective insulating plate 44′ is greater than three, there being six such radial bores 38′ and groove arms 50′ as illustrated, in order to further facilitate shattering of the protective insulating plate 44′ when the plug 18′ is shattered by the detonation of the explosive material 40′ carried thereby. By having a reasonably large number of radial bores 38′ and groove arms 50′, the fragments produced by the shattering of the plug 18′ and the protective insulating plate 44′ are generally of smaller size than would be produced where the radial bores 38′ and groove arms 50′ are few in number. This factor further reduces the prossibility that the port 12′ may not be completely opened when the explosive material 40′ carried by the plug 18′ is detonated because of partial blockage from fragments of either the plug 18′ or the protective insulating plate 44′ lodged in the port 12′.

Upon shattering of the plug 18′ and the protective insulating plate 44′ in the manner described, the high pressure gases within the rocket motor housing 10′ cause the fragments of the plug 18′ and the protective insulating plate 44′ to be blown through the auxiliary port 12′ and outwardly of the housing 10′, thereby clearing the port 12′.

In the particular embodiments shown, the protective or insulating plate 44 or 44′ may be constructed from a high temperature-resistant phenolic laminate or other material which has a high physical strength and a high temperature resistance.

It is, of course, to be understood that a plurality of the auxiliary ports with the above-described frangible plugs could be formed in a rocket motor housing and through the use of Primacord or other strand explosive, the various plugs could be connected together so that they all explode simultaneously.

It is to be understood that the forms of the invention herewith shown and described are to be taken as preferred examples of the same, and that various changes in the shape, size, and arrangement of the parts may be resorted to without departing from the spirit of this invention or the scope of the claims.

I claim:
1. In a rocket motor housing,
an auxiliary port,
a frangible plug mounted in said auxiliary port,
said frangible plug having an opening formed therein,
an explosive material positioned in and filling said opening,
a protective plate bearing against said frangible plug for insulating said frangible plug from the high temperatures inside the rocket motor housing,
said protective insulating plate being provided with a groove therein opening outwardly toward said frangible plug,
the shape of the opening in said frangible plug and the shape of the groove in said protective insulating plate substantially coinciding, and
said opening and said groove being in spaced apart registration with each other,
whereby shattering of said protective insulating plate is facilitated upon detonation of said explosive material shattering said frangible plug such that substantially simultaneous shattering of both said frangible plug and said protective insulating plate is assured when said explosive material is detonated.

2. In a rocket motor housing as defined in claim 1, wherein
the opening in said frangible plug comprises a plurality of uniform angularly spaced radial bores extending outwardly from a common center, and
the groove in said protective insulating plate comprises a plurality of uniform angularly spaced radial groove portions extending outwardly from a common center, the radial bores in said frangible plug and the radial groove portions in said protective insulating plate respectively being at least more than three in number.

3. In a rocket motor housing as defined in claim 2, wherein
said auxiliary port is provided with a counterbore,
said frangible plug has a generally cylindrical portion and an enlarged flange-like base portion,
said frangible plug being mounted in said auxiliary port with the large flange-like base portion thereof bearing against the base of said counterbore,
said generally cylindrical portion of the frangible plug being provided with a peripheral groove,
a retaining ring mounted in said peripheral groove for holding said frangible plug in said auxiliary port,
the periphery of said enlarged flange-like base portion of the frangible plug being provided with a sealing ring receiving groove,
a sealing ring mounted in said last-mentioned groove and disposed in sealing engagement with the counterbore-defining surface of said auxiliary port to prevent gases in said rocket motor housing from leaking past said frangible plug,
an actuatable detonator associated with said explosive material filling the radial bores provided in said frangible plug,
whereby actuation of said detonator detonates the explosive material, and the force of the resulting explosion shatters the frangible plug and the protective insulating plate substantially simultaneously to enable the high pressure gases inside the rocket motor housing to blow the fragments of the shattered frangible plug and the protective insulating plate through the auxiliary port outwardly of the rocket motor housing.

No references cited.

JAMES B. MARBERT, *Primary Examiner.*